(12) United States Patent
Froeschl

(10) Patent No.: US 9,720,388 B2
(45) Date of Patent: Aug. 1, 2017

(54) METHOD FOR CONTROLLING AN ELECTRICAL SYSTEM

(71) Applicant: Bayerische Motoren Werke Aktiengesellschaft, Munich (DE)

(72) Inventor: Joachim Froeschl, Herrsching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 497 days.

(21) Appl. No.: 14/459,605

(22) Filed: Aug. 14, 2014

(65) Prior Publication Data

US 2014/0350740 A1 Nov. 27, 2014

Related U.S. Application Data

(63) Continuation of application No. PCT/EP2013/052489, filed on Feb. 8, 2013.

(30) Foreign Application Priority Data

Feb. 15, 2012 (DE) ........................ 10 2012 202 284

(51) Int. Cl.
*G05B 13/02* (2006.01)
*B60L 1/00* (2006.01)
(Continued)

(52) U.S. Cl.
CPC .............. *G05B 13/026* (2013.01); *B60L 1/00* (2013.01); *B60R 16/00* (2013.01); *B60R 16/03* (2013.01);
(Continued)

(58) Field of Classification Search
None
See application file for complete search history.

(56) References Cited

U.S. PATENT DOCUMENTS 8,049,360 B2    11/2011    Karimi et al.
2006/0030972 A1  2/2006    Schlueter et al.
(Continued)

FOREIGN PATENT DOCUMENTS

CN    101500859 A    8/2009
CN    101535081 A    9/2009
(Continued)

OTHER PUBLICATIONS

Chinese Office Action issued in counterpart Chinese Application No. 201380009536.3 dated Jan. 15, 2016 with English translation (nine pages).
(Continued)

*Primary Examiner* — Qing Wu
(74) *Attorney, Agent, or Firm* — Crowell & Moring LLP

(57) ABSTRACT

A method is provided for controlling an electrical system. A first characteristic value of the electrical system is determined. For the first characteristic value, a suitable first group of optimizing variables is determined. A first group of command variables suitable for the first group of optimizing variables is determined. For the first group of command variables, a first group of current boundary values is determined. For each boundary value of the first group of current boundary values, a prediction is made to obtain a first group of predicted boundary values. A probability is assigned to each predicted boundary value of the first group of predicted boundary values to obtain a first group of predicted, probability-related boundary values. All boundary values of the first group of current boundary values and of the first group of predicted, probability-related boundary values are prioritized in order to obtain prioritized boundary values. The prioritized boundary values are used to calculate at least one control value with which the system may be controlled.

6 Claims, 1 Drawing Sheet

(51) Int. Cl.
  *B60R 16/00*    (2006.01)
  *G05B 15/02*    (2006.01)
  *B60L 11/00*    (2006.01)
  *B60R 16/03*    (2006.01)
  *H02J 3/14*     (2006.01)
  *H02J 1/14*     (2006.01)
  *H02J 4/00*     (2006.01)

(52) U.S. Cl.
  CPC ................ *G05B 15/02* (2013.01); *H02J 1/14* (2013.01); *H02J 3/14* (2013.01); *H02J 4/00* (2013.01); *B60L 1/20* (2013.01); *B60L 11/00* (2013.01); *Y02T 10/92* (2013.01)

(56) References Cited

U.S. PATENT DOCUMENTS

| 2007/0010933 A1 | 1/2007 | Hochkirchen et al. |
| 2008/0197698 A1 | 8/2008 | Gehring et al. |
| 2009/0132119 A1 | 5/2009 | Froeschl et al. |
| 2009/0267413 A1 | 10/2009 | Lemke et al. |
| 2013/0013141 A1 | 1/2013 | Neiss et al. |

FOREIGN PATENT DOCUMENTS

| DE | 10 2008 012 816 A1 | 9/2009 |
| DE | 10 2009 034 180 A1 | 2/2011 |
| DE | 10 2010 010 149 A1 | 9/2011 |
| EP | 1 511 109 A2 | 3/2005 |
| EP | 1 833 160 A2 | 9/2007 |
| JP | 2007-312581 A | 11/2007 |
| WO | WO 2005/028258 A1 | 3/2005 |
| WO | WO 2009/076968 A2 | 6/2009 |

OTHER PUBLICATIONS

International Search Report dated Jun. 17, 2013 with English translation (five (5) pages).

German Search Report dated Oct. 18, 2012, including English translation (ten (10) pages).

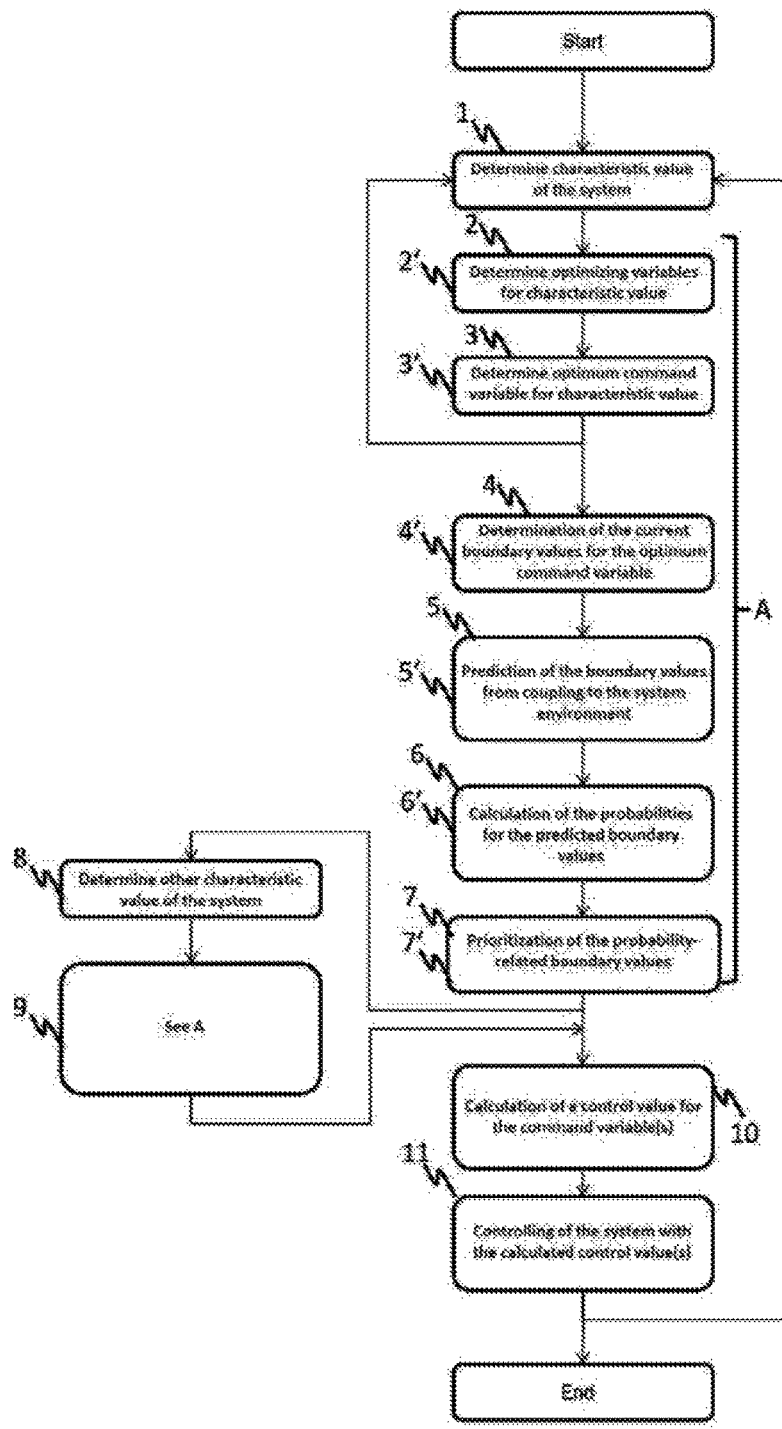

METHOD FOR CONTROLLING AN ELECTRICAL SYSTEM

CROSS REFERENCE TO RELATED APPLICATIONS

This application is a continuation of PCT International Application No. PCT/EP2013/052489, filed Feb. 8, 2013, which claims priority under 35 U.S.C. §119 from German Patent Application No. 10 2012 202 284.8, filed Feb. 15, 2012, the entire disclosures of which are herein expressly incorporated by reference.

BACKGROUND AND SUMMARY OF THE INVENTION

The invention relates to a method for controlling an electrical system.

Frequently, complex electrical systems also involve equally complex regulation and control methods for operating the electrical system. An example of such an electrical system would be, for instance, the physical power distribution system for a vehicle that has a plurality of different electrical components that function as electrical sinks and/or electrical sources.

In modern vehicle development, the umbrella term "energy management system" is used for the monitoring and control of the time-related energy flows in the power distribution system of a vehicle. The energy management system may include a plurality of control chains and control loops, and is based on including a plurality of sensors and actuators.

For instance, U.S. Pat. No. 8,049,360 B2 describes a control method for an energy management system of a vehicle, in which during vehicle operation an intelligent device receives the energy requirement from the electrical system of the vehicle and distributes energy based on the requirements.

It is the object of the invention to provide an improved method for controlling such an electrical system.

This and other objects are achieved using a method according to the invention, wherein (a) a first characteristic value of the electrical system is determined; (b) for the first characteristic value, a suitable first group of optimizing variables is determined; (c) for the first group of optimizing variables, a suitable first group of command variables is determined; (d) for the first group of command variables, a first group of current boundary values is determined; (e) for each boundary value of the first group of current boundary values, a prediction is made to obtain a first group of predicted boundary values; (f) a probability is assigned to each predicted boundary value of the first group of predicted boundary values to obtain a first group of predicted, probability-related boundary values; (g) all boundary values of the first group of current boundary values and of the first group of predicted, probability-related boundary values are prioritized in order to obtain prioritized boundary values; and, (h) using the prioritized boundary values, at least one control value is calculated with which the system may be controlled.

In addition, it is advantageous when, immediately after all of the boundary values of the first group of current boundary values and the first group of predicted, probability-related boundary values have been prioritized, a second characteristic value of the system is determined. A suitable second group of optimizing variables for the second characteristic value is then determined. A second group of command variables that is suitable for the second group of optimizing variables is then determined. For the second group of command variables, a second group of current boundary values is determined. For each boundary value of the second group of current boundary values, a prediction is made to obtain a second group of predicted boundary values. A probability is assigned to each predicted boundary value of the second group of predicted boundary values to obtain a second group of predicted, probability-related boundary values. All boundary values of the first group of current boundary values and of the first group of predicted, probability-related boundary values are prioritized and all boundary values of the second group of current boundary values and of the second group of predicted probability-based boundary values are prioritized in order to obtain prioritized boundary values. Using the prioritized boundary values, at least one control value is calculated with which the system may be controlled.

In accordance with another embodiment of the invention, the method is repeated continuously.

While the electrical system is operating, the inventive method is repeated continuously to form a closed control loop and to optimize the characteristic value or values.

It is particularly advantageous when: (a) a vehicle includes the electrical system; (b) the electrical system includes an electrical power distribution system; (c) the electrical power distribution system includes a plurality of controllable electrical energy sinks; (d) the electrical power distribution system includes a plurality of controllable electrical energy sources; (e) the electrical system includes an electronic data system with which information internal to the vehicle and external to the vehicle may be ascertained; (f) an electrical energy management system controls a plurality of controllable electrical energy sinks and controls a plurality of controllable electrical energy sources; and (g) the method according to the invention is practiced by the electrical energy management system.

In accordance with a special embodiment of the invention, information internal to the vehicle and information external to the vehicle is evaluated for predicting a boundary value.

Consequently, the energy management system of the vehicle is expanded to become a predictive energy management system. Information available in the vehicle is used for predicting boundary values. The boundary values to be expected are input into the control method and influence the control value. In this manner, it is not just one actual state of one or more characteristic values of the electrical system that acts as an observation value, but also an influence that is to be expected on this one or more characteristic values. In this manner the time-related voltage stability of the power distribution system of a vehicle may be significantly improved, for instance.

The invention is based on the considerations set forth in the following: the design of the management of an electrical system, for instance the electrical power distribution system of a vehicle, occurs statically with a functionally implemented operation strategy. This is described for instance in Elektronik Automotive, October 2008. Even the coupling with navigation data is shown in various protective rights applications and publications.

However, due to the static design, it is not possible for there to be flexible reactions to some conflicting boundary values and, in these cases, the electrical power distribution system does not have optimal stability.

The method therefor determines, for different stabilization alignments for characteristic values, which act on an identical or similar command variable in their primary control action. The characteristic values have different boundary values from the system itself and from the environment of the system. In addition to optimizing the command variables relative to the specific characteristic value, the characteristic values and the specific optimization connected thereto are prioritized in a higher monitor. The resulting, comprehensively optimal command variable is determined as a function of the prioritization that is determined in this manner and that is based on system boundary values.

The sequence of steps in the optimization process includes:

1. Determine data for optimizing characteristic value 1,
2. Calculate the optimal command variable relative to characteristic value 1,
3. Perform steps 1 and 2 for additional characteristic values,
4. Determine the boundary values with the associated probabilities,
5. Prioritize the boundary values,
6. Calculate the comprehensively optimal command variable,
7. Initiate the correcting variable for adjusting the optimal command variable,
8. Repeat steps 1-7

An example of an electric system is the electric power distribution system of a motor vehicle, in which the goal is to optimize according to essentially the four following characteristic values: efficiency, provision of power, energy flow, and energy storage.

For instance, efficiency with respect to the optimal electrical system voltage is determined from the specific information regarding efficiency over the current electrical system voltage. The data are stored either centrally in a management system or in a decentralized manner in the individual components of the electrical system. In the latter case the data must be transferred to the management system.

Provision of power influences the electrical system voltage in that adequate voltage must be provided to the components in case one consumer requires high power for a brief period or a generator generates high power for a brief period. The focus here is the peak power of the components; in the first case there is a risk that an undervoltage will occur, and in the second case there is a danger that an overvoltage will occur.

In the case of energy flow, the electrical system voltage should be adjusted such that all components that are present and activated are adequately supplied with energy, and thus on average the energy storage unit, if there is one, is not discharged or overcharged. In the electrical systems in question, using the Kirchhoff equations, which are known to one skilled in the art, the electrical system voltage correlates to the energy flow equilibrium between the components.

With the energy storage unit, normally a 12-volt lead acid battery, it is important from the perspective of aging to, on the one hand, control the energy flow into and out of the storage unit for draining and overcharging and, on the other hand, keep the total energy quantity, which is determined by charging and discharging (often called cycling in this context) within limits.

The electrical system voltage together with the chemical properties of the battery determines whether the battery is being charged or discharged. A suitable or (ideally) optimal electrical system voltage is set depending on whether a peak power event is expected, whether equilibrium must be maintained in the electrical system, whether the energy storage unit requires a limit, and whether the optimum efficiency can be adjusted.

Thus, optimization is provided taking into account the prevailing boundary values, which are calculated or estimated from the electrical power distribution system itself and from the information determined from coupling to the environment.

This method attains an improvement in the stability of the electrical system, in this case of the power distribution system of a vehicle, for the purpose of improving the quality of the system and components. Likewise, the energy efficiency is improved with cost-optimized components without a separate power control in the electrical power distribution system. In addition, in a modern vehicle, the method represents a cost-effective method for improvement using available infrastructure.

Other objects, advantages and novel features of the present invention will become apparent from the following detailed description of one or more preferred embodiments when considered in conjunction with the accompanying drawing.

BRIEF DESCRIPTION OF THE DRAWING

Figure is a flow chart schematically depicting a method for controlling an electrical system according to an embodiment of the invention.

DETAILED DESCRIPTION OF THE DRAWING

The Figure schematically depicts a method for controlling an electrical system using the example of an electrical power distribution system for a vehicle.

The vehicle includes the electrical power distribution system for the electrical system. The electrical power distribution system itself has a plurality of controllable, electrical energy sinks One such energy sink may be, for instance, a seat heater or an electrical air conditioning compressor for the vehicle.

The electrical power distribution system furthermore has a plurality of controllable electrical energy sources, wherein an example could be a 12-volt battery or a generator.

In addition to the electrical system, the vehicle also includes an electronic data system with which information internal to the vehicle and information external to the vehicle may be ascertained. Various devices and methods may be information sources, e.g. navigation, radar, or camera devices in the vehicle, and car-to-car communication systems or traffic management systems external to the vehicle that have a data connection to the vehicle.

An energy management system for the vehicle operates the electrical system. This means that the electrical system is monitored and controlled by the energy management system. Control interventions are performed via controllable electrical components, that is, the controllable energy sinks and controllable energy sources. The energy management system itself may be embodied as software and may be capable of running on a component of the electrical data system, e.g. on a control unit. The components to be controlled are integrated into both the electrical data system and the power distribution system.

First, a characteristic value of the electrical system is determined (1). Without representing a general limitation, such a characteristic value is, for example, the voltage level of the power distribution system for the vehicle.

The voltage level characteristic value of the power distribution system has at least one optimizing variable. This is determined (2). An optimizing variable for the voltage level of the power distribution system may be, for example, the voltage-related interval between the voltage level of the power distribution system and a target value or target corridor prescribed for the voltage level. Without representing a general limitation, this optimizing variable in this exemplary embodiment is called the voltage interval. In this case this means that the voltage interval should be optimized, i.e. controlled to no voltage interval, that is, to the value zero for the voltage interval.

Then, a suitable command variable is determined for the optimizing variable. Without representing a general limitation, it may be, for example, the output voltage of the generator in the electrical system. This command variable is called the generator output voltage hereinafter.

In further step (4), all available current boundary values are determined for the command variable generator output voltage. In the example of the generator output voltage, these are for instance the excitation voltage of the generator, the torque of the generator shaft, and the output power. In the example of the energy power distribution system of a vehicle during operation, the currentness of the boundary values is measured in milliseconds.

In another step (5), predictions for the determined boundary values are generated. The generation of the expected boundary values per se is not the subject-matter of this document. However, generated predicted boundary values are the subject-matter of the method being presented. The prediction includes, for instance, information about the torque to be expected on the generator shaft. Such information may be obtained for instance by evaluating roadmap information. If it is known, e.g., that a highway exit will be reached in the next few seconds of driving, if the exit is taken it can be expected that the engine speed, and thus the generator speed, will be reduced. It is possible that a traffic management system will display a warning for "heavy traffic" that may be detected by a camera system internal to the vehicle. In this case, it may be expected that continuing on this road will result in slow driving progress and a relatively slow generator speed. However, it could also be that an online weather report for the region in which the vehicle route is disposed predicts heavy rain. In this case, an increased load on the power distribution system could be expected, since the windshield wipers and the low-beam headlights might be operated. A great number of different prognostic data for different command variables are possible for modern vehicles. It is not determining these variables, but rather incorporating them into the energy management system that is the subject-matter of this embodiment, so that the examples selected should be considered only as examples.

In the next step, step (6), a probability of occurrence is determined for each boundary value from step (5). Where necessary, step (6) may be combined with step (5) in a different embodiment. The result of step (6) is, for instance, the probability with which the vehicle will take the highway exit and not continue on the highway. Navigation data, for instance, may be used for this determination. Alternatively, a driver-specific driving profile may be used that determines typical routes for a driver who has been authenticated using a personalized key. Using car-to-car communication, it is possible to determine that the heavy traffic will clear up rapidly and that there then will be a high probability that clear traffic conditions, and thus a faster generator speed, may be expected. If the weather report for the region into which the vehicle will be travelling is updated with information from the vehicle's rain sensor indicating "light rain," the probability that heavy rain will actually occur in the region in question increases and thus so does the probability of demand for generator output power due to operation of the windshield wipers at a faster speed.

In a further step (7), the boundary values that were determined in step (6) in terms of their probability of occurrence are prioritized. This means that the boundary values that are likely to occur with a certain probability are ordered according to their relevance. For instance, the fact that windshield wipers are expected to be operated at the highest speed may be categorized as more relevant than a higher generator speed due to the probability that the roads will have light traffic.

If the voltage interval has an electrical system voltage below the target corridor, the prioritization according to step (7) indicates that the generator output voltage will drop due to the highly relevant windshield wiper operation. Consequently, a generator output voltage that is to be boosted is calculated as the control value in step (10).

In the selected example, the system is actuated via the excitation current of the generator as the control variable.

The method leads to the situation that when the rainy region is reached and there is heavy rain, the electrical load of the fastest windshield wiper speed does not lead to a critical value, but rather to a nominal value, of the generator output voltage, since the excitation current had already been increased predictively. Therefore, the method may be called a predictive energy management system.

In accordance with another embodiment, after the prioritization of the boundary values in step (7), it may be useful to determine another characteristic value of the system (8) and to obtain and prioritize additional boundary values for this characteristic value in the manner described (9 or 2' through 7'). This is useful, e.g., when the prioritization according to step (7) does not provide any relevant boundary value.

In another embodiment, the method is repeated continuously in the energy management system of the vehicle during driving operation of the vehicle. Since the method can be applied not only to the voltage stability of the power distribution system of a vehicle, but also for instance to the efficiency of the power distribution system, in this manner it is possible to attain electrical driving operation that is more voltage-stable and energy efficient, since, prior to the occurrence of a condition of the electrical system, the energy management system has adjusted control values such that a better condition of the electrical system occurs in this moment.

In the aforesaid exemplary embodiment, turning the windshield wipers on does not lead to any drop in voltage in the electrical system since a control value that compensates for the additional load in the electrical system that the windshield wiper operation creates was predictively assigned to the excitation current for the generator.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method for controlling an electrical system, the method comprising the acts of:

determining a first characteristic value of the electrical system;

for the first characteristic value, determining a suitable first group of optimizing variables;

determining a first group of command variables suitable for the first group of optimizing variables;

for the first group of command variables, determining a first group of current boundary values;

for each boundary value of the first group of current boundary values, predicting a first group of predicted boundary values;

assigning a probability to each predicted boundary value of the first group of predicted boundary values to obtain a first group of predicted, probability-related boundary values;

prioritizing all boundary values of the first group of current boundary values and of the first group of predicted, probability-related boundary values in order to obtain prioritized boundary values;

using the prioritized boundary values, calculating at least one control value; and controlling the electrical system using the at least one calculated control value.

2. The method according to claim 1, further comprising the acts of:

immediately after all of the boundary values of the first group of current boundary values and the first group of predicted, probability-related boundary values have been prioritized, determining a second characteristic value of the electrical system;

determining a suitable second group of optimizing variables for the second characteristic value;

determining a second group of command variables that is suitable for the second group of optimizing variables;

for the second group of command variables, determining a second group of current boundary values;

for each boundary value of the second group of current boundary values, predicting a second group of predicted boundary values;

assigning a probability to each predicted boundary value of the second group of predicted boundary values to obtain a second group of predicted probability-related boundary values;

prioritizing all boundary values of the first group of current boundary values and of the first group of predicted probability-related boundary values and all boundary values of the second group of current boundary values and of the second group of predicted probability-based boundary values in order to obtain prioritized boundary values; and using the prioritized boundary values, calculating at least one control value with which the system may be controlled.

3. The method according to claim 1, wherein the method is repeated continuously.

4. The method according to claim 2, the method is repeated continuously.

5. A vehicle, comprising:

an electrical system of the vehicle, the electrical system including:

an electrical power distribution system comprising a plurality of controllable electrical energy sinks and a plurality of controllable electrical energy sources;

an electronic data system programmed to ascertain information internal to the vehicle and external to the vehicle;

an electrical energy management system that controls the plurality of controllable electrical energy sinks and the plurality of controllable electrical energy sources, the electrical energy management system including a controller programmed to:

determine a first characteristic value of the electrical system;

for the first characteristic value, determine a suitable first group of optimizing variables;

determine a first group of command variables suitable for the first group of optimizing variables;

for the first group of command variables, determine a first group of current boundary values;

for each boundary value of the first group of current boundary values, predict a first group of predicted boundary values;

assign a probability to each predicted boundary value of the first group of predicted boundary values to obtain a first group of predicted, probability-related boundary values;

prioritize all boundary values of the first group of current boundary values and of the first group of predicted, probability-related boundary values in order to obtain prioritized boundary values;

use the prioritized boundary values, calculating at least one control value; and control the electrical system using the at least one calculated control value.

6. The vehicle according to claim 5, wherein the information internal to the vehicle and the information external to the vehicle is evaluated for predicting the boundary values.

* * * * *